United States Patent
Herrod et al.

(10) Patent No.: US 6,237,053 B1
(45) Date of Patent: May 22, 2001

(54) CONFIGURABLE OPERATING SYSTEM HAVING MULTIPLE DATA CONVERSION APPLICATIONS FOR I/O CONNECTIVITY

(75) Inventors: Allan Herrod, Farmingville; James R. Fuccello, Patchogue; Donald E. Schafer, Wantagh; Steven Kramp, Kings Park; Eugene B. Joseph, Coram; Duanfeng He, Farmingville; Arman Nikzad, Holbrook, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/107,838

(22) Filed: Jun. 30, 1998

(51) Int. Cl.[7] ............................. G06F 13/38; G06F 13/12

(52) U.S. Cl. ................................ 710/65; 710/72; 710/73

(58) Field of Search ........................... 710/5, 7, 65, 72, 710/73, 20; 707/102, 516, 523

(56) References Cited

U.S. PATENT DOCUMENTS

| | | | |
|---|---|---|---|
| 4,135,149 | * 1/1979 | Takahashi et al. | 340/147 |
| 4,719,564 | * 1/1988 | Hara | 395/705 |
| 5,029,183 | 7/1991 | Tymes | 375/1 |
| 5,280,498 | 1/1994 | Tymes et al. | 375/1 |
| 5,280,621 | * 1/1994 | Barnes et al. | 710/62 |
| 5,379,374 | * 1/1995 | Ishizaki et al. | 345/331 |
| 5,442,246 | * 8/1995 | Azegami et al. | 326/38 |
| 5,528,621 | 6/1996 | Heiman et al. | 375/200 |
| 5,604,516 | 2/1997 | Herrod et al. | 345/168 |
| 5,634,058 | 5/1997 | Allen et al. | 395/712 |
| 5,668,803 | 9/1997 | Tymes et al. | 370/312 |
| 5,675,139 | 10/1997 | Fama | 235/472 |
| 5,682,534 | 10/1997 | Kapoor et al. | 395/684 |
| 5,694,580 | * 12/1997 | Narita et al. | 710/1 |
| 5,740,455 | * 4/1998 | Pavley et al. | 707/515 |
| 5,748,974 | * 5/1998 | Johnson | 704/9 |
| 5,751,962 | 5/1998 | Fanshier et al. | 395/200 |
| 5,777,580 | 7/1998 | Janky et al. | 342/457 |

(List continued on next page.)

FOREIGN PATENT DOCUMENTS

| | | | |
|---|---|---|---|
| 0 782 297 A2 | 7/1997 | (EP) | H04L/12/28 |
| 0 837 406 A2 | 4/1998 | (EP) | G06F/17/30 |
| 406019811 | * 1/1994 | (JP) | G06F/13/00 |
| 406110873 | * 4/1994 | (JP) | G06F/15/20 |

OTHER PUBLICATIONS

D.R. Dewar "Data Packer" IBM Technical Disclosure Bulletin, Jun. 1982, vol. 25, No. 1, pp. 265–268.*

Primary Examiner—Thomas Lee
Assistant Examiner—Chim Cao
(74) Attorney, Agent, or Firm—Sierra Patent Group, Ltd.

(57) ABSTRACT

A configurable operating system allows small, inexpensive, and less powerful computers to run a wide variety of applications. The operating system provides for the capability to accept input from a number of input devices, and transfer the data to the appropriate application without using an application to perform the routing tasks, thus freeing up more processor time and memory space for the applications. Data format translator applications may be called by the operating system in order to convert the data to the proper format. The decision as to which application should be called may be made by using information on the input device which the data came from, as well as additional information, to determine if a conversion application or other application is required.

A method for using the operating system may include the steps of: receiving data from an input device; determining the type of the input device; choosing one or more applications to send the data through based on the type of the input device; and sending the data to the first of the applications, receiving data from the first of the applications, and repeating for the next of the applications until reaching the last of the applications.

106 Claims, 7 Drawing Sheets

U.S. PATENT DOCUMENTS

| | | | |
|---|---|---|---|
| 5,778,377 | 7/1998 | Marlin et al. | 707/103 |
| 5,778,380 | 7/1998 | Siefert | 707/103 |
| 5,784,544 * | 7/1998 | Stevens | 395/112 |
| 5,802,381 * | 9/1998 | Matsumoto et al. | 707/517 |
| 5,845,283 * | 12/1998 | Williams et al. | 707/101 |
| 5,865,546 * | 2/1999 | Ganthier et al. | 400/489 |
| 5,997,168 * | 12/1999 | Harper et al. | 364/191 |
| 6,031,830 | 2/2000 | Cowan | 370/338 |
| 6,034,685 * | 3/2000 | Kuriyama et al. | 345/341 |
| 6,076,099 | 6/2000 | Chen et al. | 709/202 |

* cited by examiner

CONFIGURABLE OPERATING SYSTEM HAVING MULTIPLE DATA CONVERSION APPLICATIONS FOR I/O CONNECTIVITY

RELATED APPLICATIONS

This application is related to application Ser. No. 09/107,237, filed the same day as the present application, entitled "AUTOMATIC TRANSFER OF DATA FROM AN INPUT DEVICE TO A SOFTWARE APPLICATION".

BACKGROUND OF THE INVENTION

1. Field of the Invention

The present invention relates to the interaction between computer devices and input devices. More specifically, the present invention relates to a configurable operating system for automatic transfer and conversion of data from input devices to applications.

2. The Prior Art

For many years, computers were large, bulky machines that were difficult to transport. More recently, however, computers have evolved to such a degree that portable laptop, palmtop, and other small computers have become quite common. Additionally, small yet inexpensive computers have been developed which lack much of the processing power and memory availability of the more expensive, or larger computers, but have just enough power and memory to perform specific tasks. These computers are used in a number of different applications, including inventory control, word processing, and data collection.

Typically, these computers are used with a wide variety of input devices. These include keyboards, bar code symbol scanners, image scanners, microphones, digital cameras, and electronic pens, among others. The goal of these systems is to allow information (audio, bar code symbol, video, text, etc.) to be received by the computer and transferred to an application program in a form the application can use. Generally, the task of managing these input devices falls on an application program containing routines which were developed on a case by case basis. For example, a word processor may require input from a keyboard. Therefore, the word processor will be designed with some code routines that cause the word processor to wait for input from a keyboard, and when input is received, to print the input on the screen where the cursor is located.

A keyboard is a relatively simple input device. When using a more advanced input device, such as a bar code symbol scanner, the process becomes even more cumbersome. The word processor will be designed with some code routines that cause the word processor to look for input from a bar code scanner, then to go through a process of conversions to convert the input signals into information that the word processor can use. A similar problem arises in the use of image scanners, where optical character recognition (OCR) software may be needed in order to convert the "picture" data to "text" data. Code routines need to be developed on a case by case basis to call the appropriate conversion applications.

One example of the use of an application program to manage the input from various devices is contained in U.S. Pat. No. 5,604,516, which discloses an interface that polls the appropriate input devices until a signal is received, then disables access to other input devices while data is being received. While this polling method provides for a highly efficient interface to manage multiple input devices, it is still being managed by an application, thus using up valuable memory and processor time. What is needed is an interface that may be run by an operating system, reducing the burden placed on the application or applications.

Another problem that arises during the management of input devices is that oftentimes input signals may be in an improper form due to an incorrect setting on the input device. For example, the volume of the audio data input from a microphone may be too low due to the recording level on the microphone being at too low a setting, or the image data from a scanner may be too dark because the iris control on the scanner is set incorrectly. The data can normally be corrected using application programs, such as a program which amplifies the sound data to correct for the low recording level of a microphone, or a program which increases the brightness of an image to correct for an incorrect iris setting. However, programs such as these use up valuable processor and memory resources. What is needed is an interface that may reconfigure the input devices such that future data received from the input devices does not require correction, or at least minimizes the correction needed.

Another problem that arises in the use of such small computers is that they may require a large number of conversion applications in order to properly translate all of the possible types of input data. For example, for a word processing application alone, the system may require conversion programs to translate data from a scanner, a microphone, a bar code symbol reader, and an electronic pen. This multiplicity of conversion programs takes up valuable memory space. What is needed is a system that reduces the number of conversion applications on a computer.

Additionally, because of the relative lack of processing speed and memory contained in the small computers (which reduces the size and cost of the computers), the computers are generally tailored to specific tasks. For example, one computer may be tailored to inventory control while another is tailored to word processing. Thus, to reduce the burden on the system, the operating system may also be tailored to the specific task. This creates a problem, however, when the user wishes to switch from one task to another. Manually loading a new operating system and application programs can be a time consuming task, involving attaching an interface and a disk drive or some other storage medium to the computer or perhaps returning the computer to a docking station for reprogramming. What is needed is a system having an interface which allows for automatic and simple updates to the operating system and application programs.

It is therefore an object of the present invention to provide an interface which may be run by an operating system, reducing the burden placed on the application or applications and therefore reducing the amount of memory and processor speed required by the system.

It is a further object of the present invention to provide an interface which may control the settings on the input devices to reduce the number of manipulations that need to be run on incoming data.

It is a further object of the present invention to provide a system which contains multiple conversion applications taking up less space than multiple conversion applications normally would.

It is a further object of the present invention to provide a system in which the operating system and applications may be automatically updated quickly and easily.

BRIEF DESCRIPTION OF THE INVENTION

A configurable operating system allows small, inexpensive, and less powerful computers to run a wide variety of applications. The operating system provides for the capability to accept input from a number of input devices, and transfer the data to the appropriate application without using an application to perform the routing tasks, thus freeing up more processor time and memory space for the applications. Data format translator applications may be called by the operating system in order to convert the data to the proper format. The decision as to which application should be called may be made by using information on the input device which the data came from, as well as additional information, to determine if a conversion application or other application is required.

A method for using the operating system may include the steps of: receiving data from an input device; determining the type of the input device; choosing one or more applications to send the data through based on the type of the input device; and sending the data to the first of the applications, receiving data from the first of the applications, and repeating for the next of the applications until reaching the last of the applications.

BRIEF DESCRIPTION OF THE DRAWING FIGURES

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
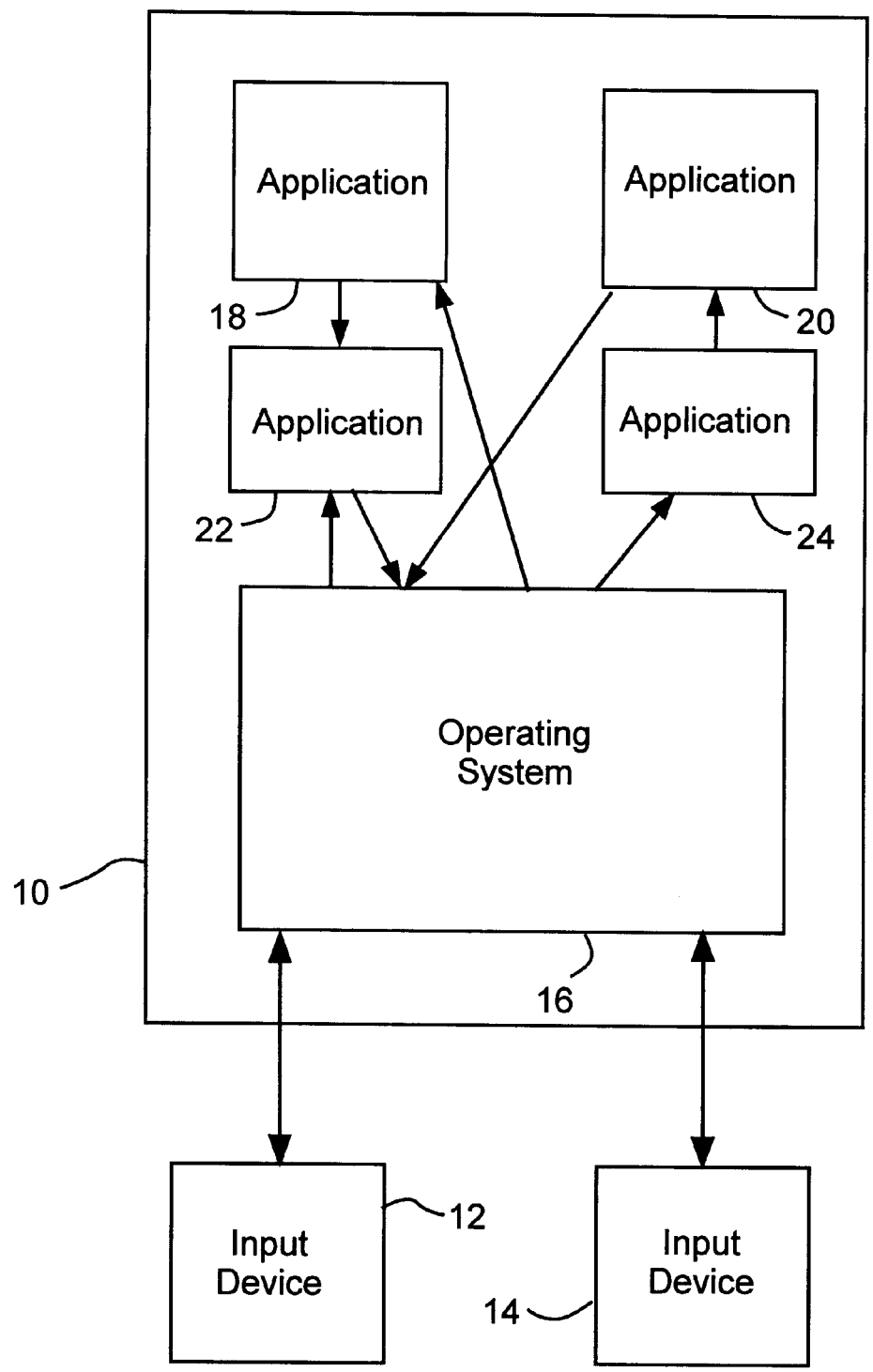
FIG. 1 is a block diagram illustrating a computer system for use with the present invention.

FIG. 1 depicts a computer system for managing input in accordance with a first embodiment of the present invention. Computer 10 is connected to one or more input devices 12, 14. These input devices may be of any type, including keyboards, mice, bar code symbol readers, scanners, microphones, and the like. Computer 10 contains an operating system 16 and also contains one or more applications 18, 20, 22, 24 which are designed to perform the higher level tasks in which the user is interested. For example, if the computer 10 is being used for inventory control, then the computer will likely contain some sort of inventory control software. Some of these applications 18, 20, 22, 24 may be data format translators. The data format translators are capable of converting one type of data into another and are generally used in conjunction with other applications. For example, if a scanner is being used with a word processing program, it may be necessary to convert the image data sent from the scanner into text data usable by the word processor. In such a case, an optical character recognition application may be used to convert the data. Operating system 16 manages the input, translation, and routing of the data.

FIG. 1 depicts a computer system having four applications. However, the present invention may be used with systems that have any number of applications and input devices. For example, a computer may have only a single application such as a word processing program, yet have a large number of input devices, such as a keyboard, mouse, microphone, scanner, and the like. The computer may also contain a number of different data format translators and the data may need to be passed through more than one data translator before being sent to the appropriate application.

Figure 2:
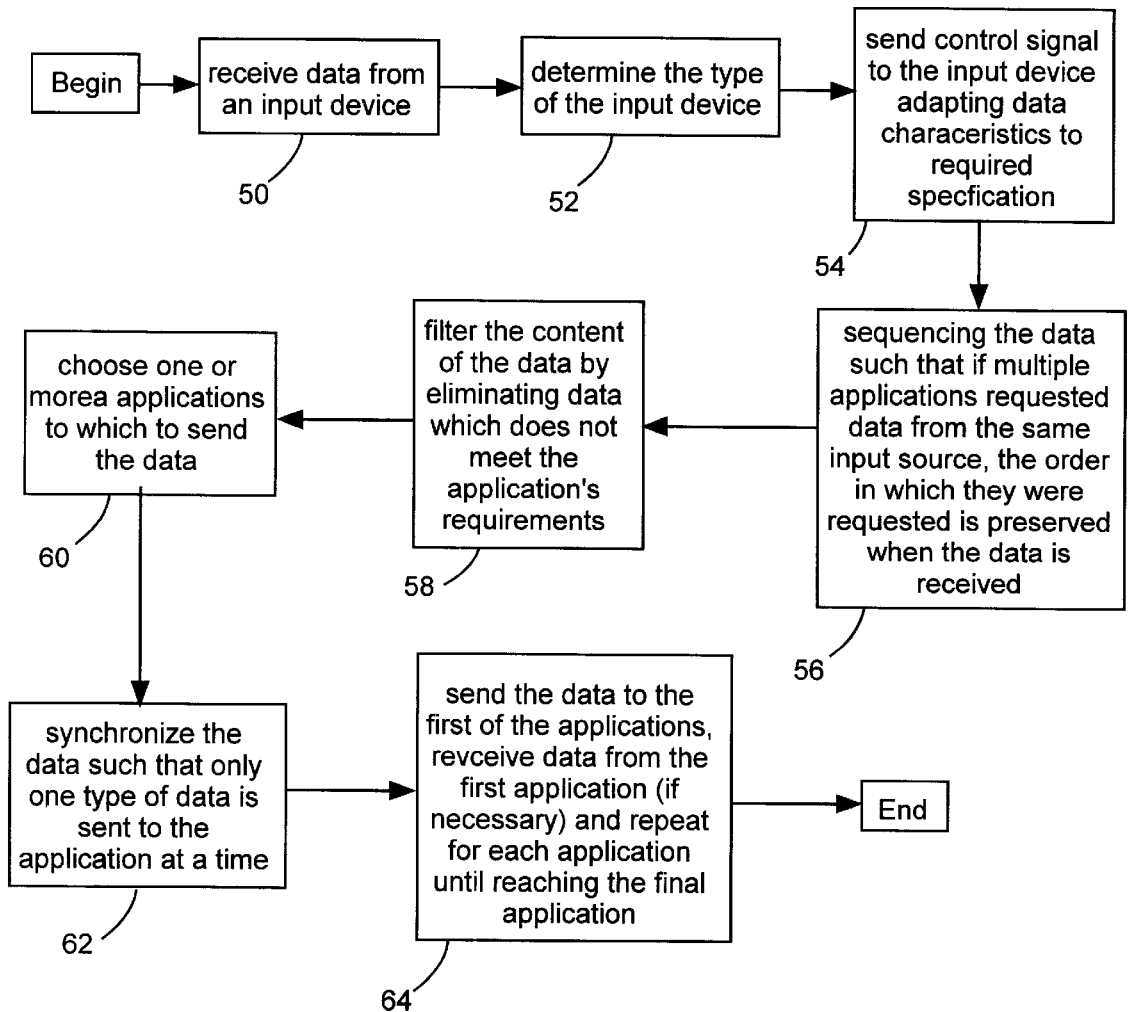
FIG. 2 is a flow diagram illustrating a method for using an operating system in accordance with a first embodiment of the present invention.
Figure 3:
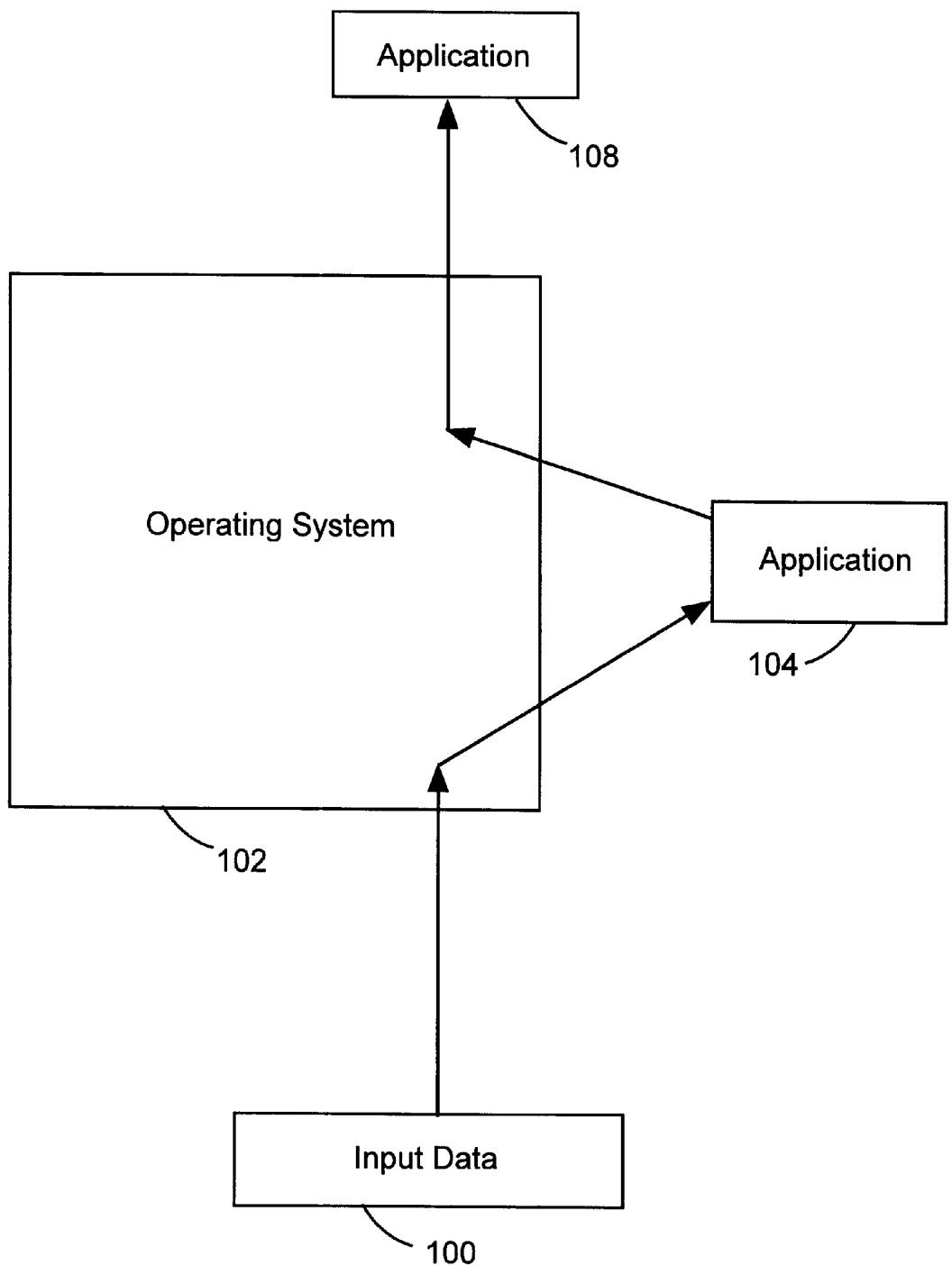
FIG. 3 is a block diagram illustrating the movement of input data through an operating system and two applications in accordance with the present invention.
Figure 4:
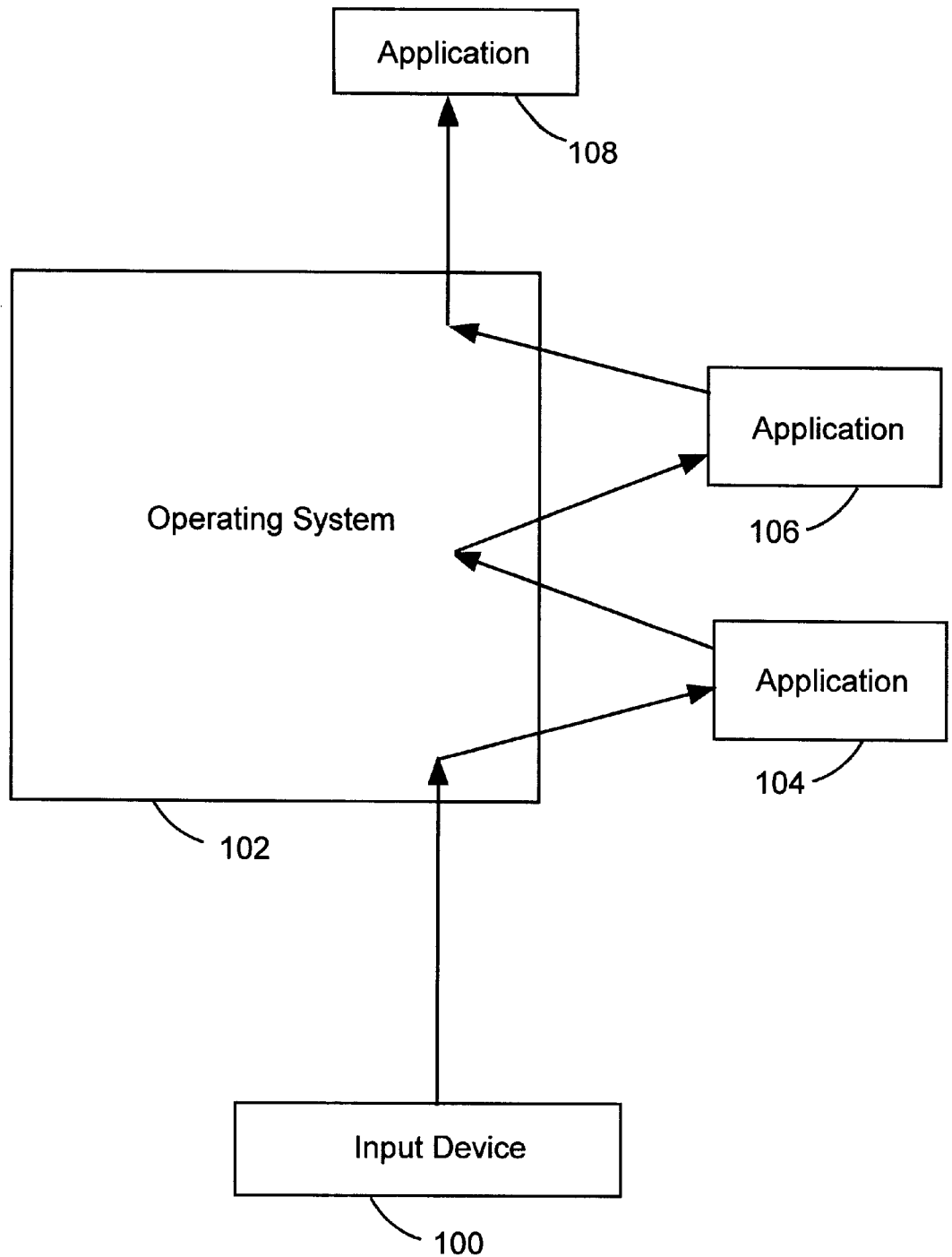
FIG. 4 is a block diagram illustrating the movement of input data through an operating system and three applications in accordance with the present invention.

FIG. 2 is a flow diagram of a method for using an operating system in accordance with a first embodiment of the present invention. At step 50, data is received from an input device. This step is also depicted in FIGS. 3–4. FIGS. 3 and 4 are block diagrams illustrating the movement of input data through an operating system in accordance with the present invention. In both FIG. 3 and FIG. 4, the input data 100 is received by the operating system 102.

At step 52, a control signal may be sent to the input device adapting the data characteristics to the required specification. This control signal may be based on the content of the data. For example, data from an image scanner may come in too bright. Therefore, in subsequent scans, it is desirable to lower the brightness level. While applications can be used to correct for the brightness, these applications take up processor time and memory. By sending a control signal to the image scanner informing it to turn down the brightness on subsequent scans, the amount of correction needed on the data can be greatly reduced.

At step 54, the type of the input device is determined. This step may be performed in several different ways. An object model may be used within the data itself may be used to signify the type of the input device. This is known as data source tagging. For example, data from a microphone may include a unique identifier in a specific field in the data signifying that the data came from the microphone. It is preferable to have unique identifiers for each input device such that multiple input devices of the same type (such as two microphones) may be differentiated. At step 54, this tag may be examined and compared with a list of input devices and their corresponding tags to determine the source of the data. The precise mechanism by which data source tagging is performed and utilized is contained in Appendix A.

Another way to perform step 54 is to examine the format of the data. Each type of input device produces a different format of data and this format may be compared with a list of input devices and corresponding formats to determine the source of the data.

At step 56, the data may be sequenced. Sequencing is sometimes required because it is possible for multiple applications to request data from the same source with no unique characteristics to distinguish the data. If neither request has been fulfilled yet, the operating system might have trouble determining where to send the data. Sequencing causes the operating system to preserve the order in which the applications requested data from input device. For example, if application #2 requests data from a scanner, and then a few moments later application #1 requests data from a scanner, then the first piece of undistinguished data that arrives from scanner would be routed to application #2 and the second would be routed to application #1.

At step 58, the content of the data may be filtered by eliminating data which does not meet the application's requirements. This filtration step, however, will most likely be fairly limited, as drastic changes to the data will be performed by one or more data format translators later in the process. One possible filtration function that may be performed at step 56 is truncating a portion of the data to meet size limitations of the applications, operating system, or hardware. For example, if there is only 1 megabyte of RAM in the computer system, any data larger than 1 megabyte may be deleted, truncating the data.

At step 60, the operating system chooses one or more applications to which to send the data. This choice may be based on any number of factors, including the type of the input device and the size of the data. Of course, if a specific application requested the data then the data will be sent to that application, but even in this case oftentimes the operating system will have to examine the data in order to determine if it matches the request.

One possible implementation of this step uses an object model which represents data with a data descriptor. For example, data containing information about a bar code will be placed in an object type which corresponds to bar code symbols. Thus, the operating system can examine the object type of the data and use that in determining which application or applications to which to send the data.

An important portion of this step may involve determining whether it is necessary to pass the data through a data format translator before passing it to another application program. This determination will be made based on the destination application and the type of the input device. This ensures that the data will be in the proper format.

At step 62, the data may be synchronized. Synchronization may be necessary in the case where two pieces of data destined for the same application arrive in the operating system at the same time. In such a case, it would be possible for the data from one input source to be mixed with data from a second input source. This situation would almost certainly result in the destruction of the integrity of both pieces of data. For example, an application may request text data from a keyboard for entry into a specific field, and also request bar code symbol data from a bar code symbol scanner for entry into a separate field. If the bar code symbol data was mixed with the text data, the data would be corrupted. Thus, in such situations, data may be synchronized such that only one type of data is sent to the application at a time.

At step 64, the operating system 102 sends the data to the first of the applications chosen, receives data from the first application (if necessary), and repeats this for each application until reaching the final application. This step is depicted in FIG. 3, as operating system 102 passes input data 100 to data format translator 104, which then passes it back to operating system 102. For example, if data from a scanner is going to be used in a word processing application, the operating system may choose to pass the data through an optical character recognition application before passing it to the word processor.

It is also possible that the operating system may have chosen to pass the data through more than one data format translator before sending it to the destination application. This is depicted in FIG. 4, as operating system 102 passes input data 100 to data format translator 106, which then passes it back to operating system 102. Then operating system 102 passes the translated data to data format translator 106, which then passes it back to operating system 102. For example, if a list of numbers is going to be scanned in using a scanner and used in binary numerical format as input to an application, the operating system may choose to pass the data through an optical character recognition application to convert the image data to ASCII characters, and then pass it through an ASCII to binary number converter application before sending it to the destination application.

Referring to FIG. 4, the diagram of this step may appear disjointed, with the operating system 102 calling many data format translators 104, 106 or other applications before ultimately passing on the data to the destination application 108, which may, of course, then proceed to call other applications using the operating system. Due to this disjointed appearance, this process may be termed "data blending".

Figure 5:
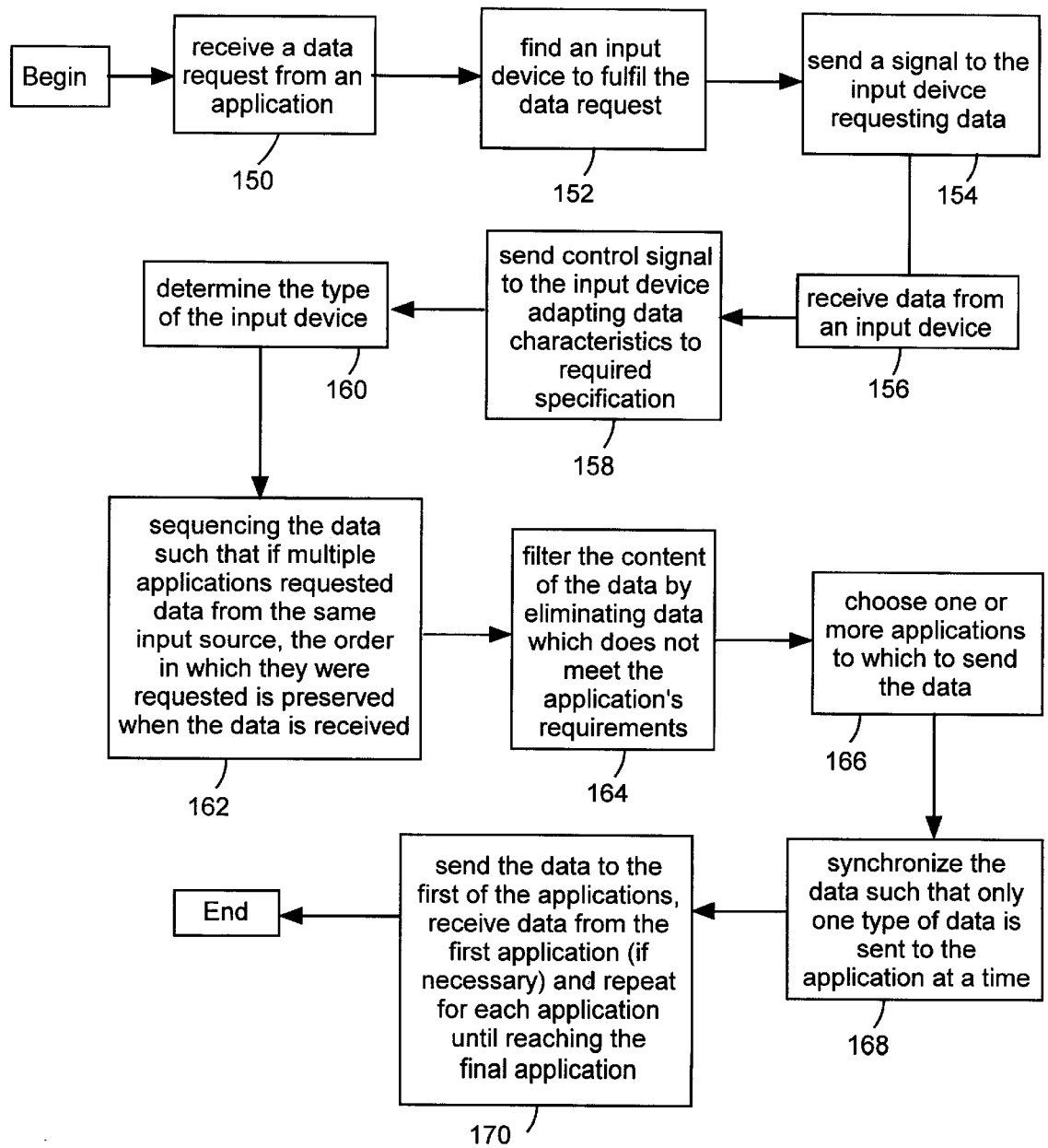
FIG. 5 is a flow diagram illustrating a method for using an operating system in accordance with a second embodiment of the present invention.

FIG. 5 is a flow diagram illustrating a second embodiment of the present invention. In this embodiment, the operating system acts to fulfill data requests that are sent to it from the various applications. At step 150, the operating system receives a data request from an application. At step 152, the operating system finds an input device to fulfill the data request. At step 154, the operating system sends a signal to the input device requesting data. For example, if a word processor requests text data from a scanner, the operating system may scan the system looking for a scanner. When it finds a scanner, it sends a signal to the scanner requesting data. The scanner may then be activated. This allows for the automatic handling of data requests.

The rest of the steps in the second embodiment are similar to that of the first embodiment. At step 156, the data is received from the input device. At step 158, a control signal may be sent to the input device adapting the data characteristics to the required specification. At step 160, the type of the input device is determined. This step may be performed in the several different ways discussed before. Despite the fact that the application specifically requested data from a specific source, in the implementation of the operating system there may be several applications requesting data at the same time, thus it will be important to keep track of which data came from which source.

At step 162, the data may be sequenced. At step 164, the content of the data may be filtered by eliminating data which does not meet the application's requirements. At step 166, the operating system chooses one or more applications to which to send the data. Although the final destination application of the data will most likely be the application that requested the data, it may be necessary to pass the data through data format translators or other applications before reaching the final application.

At step 168, the data may be synchronized. At step 170, the operating system sends the data to the first of the applications chosen, receives data from the first application (if necessary), and repeats this for each application until reaching the final application.

Figure 6:
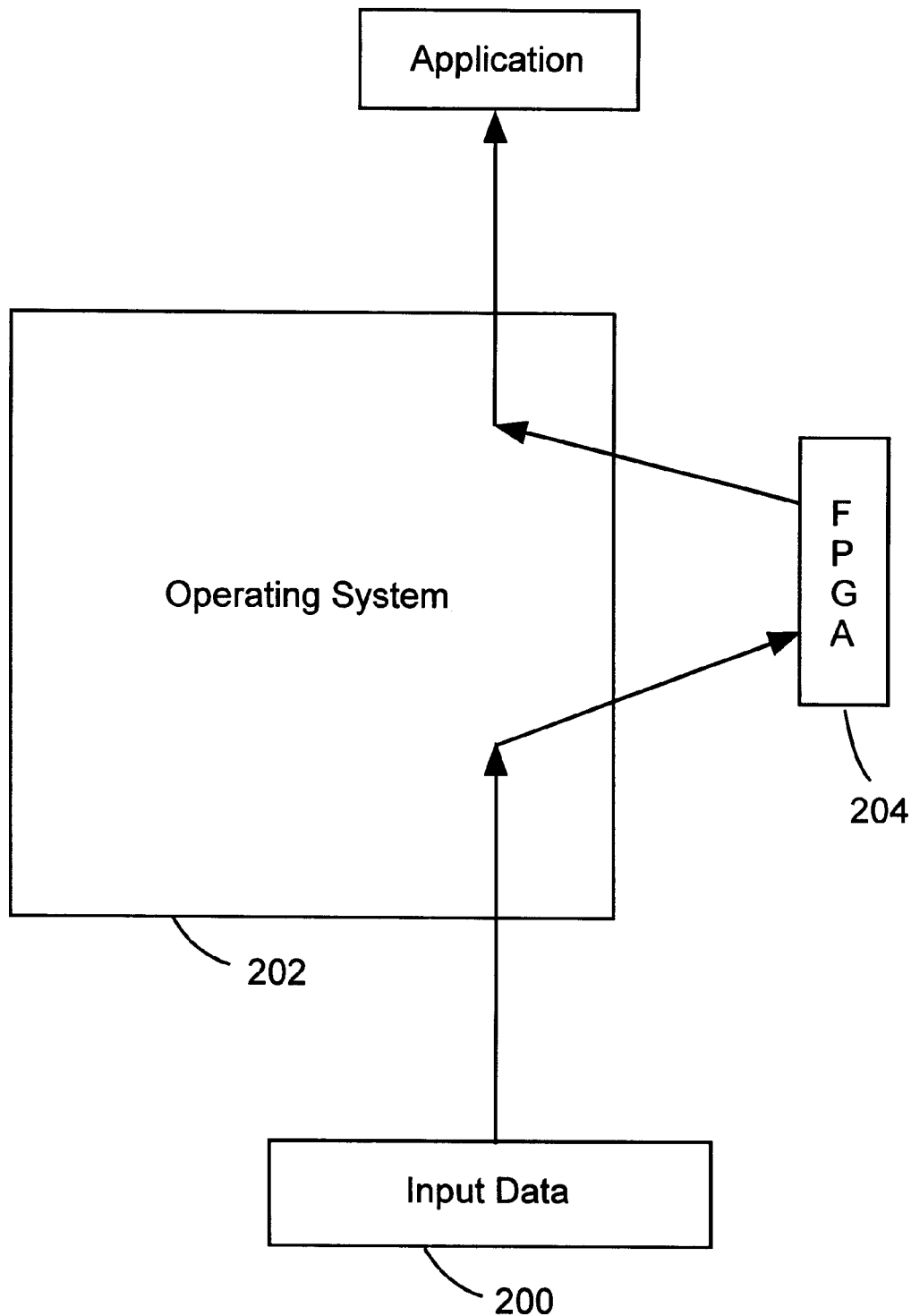
FIG. 6 is a block diagram illustrating the use of a field reprogrammable gate array in a system in accordance with a third embodiment of the present invention.

FIG. 6 is a block diagram illustrating a third embodiment of the present invention. In this embodiment, the data format translations are performed by hardware components rather than software applications. Input data 200 is received by operating system 202. Operating system 202 then passes input data 200 through a field reprogrammable gate array 204. The field reprogrammable gate array 204 may be used to simulate the performance of a software data format translator. This field reprogrammable gate array may be reprogrammed at any time to alter the type of translation it performs. For example, it may be programmed as an optical character recognizor in order to translate scanned image data into ASCII data, and then it may be reprogrammed as an audio to text converter in order to translate data from a microphone into ASCII data.

There are several advantages to performing the data format translations using a field reprogrammable gate array rather than software. First, hardware generally runs faster than software, which will increase the overall speed of the system. Second, using hardware eases the burden on the processor and memory. As discussed earlier, slow processing speed and low memory are significant problems in small, cheap computers such as handheld devices. Third, one or more field reprogrammable gate arrays may be reprogrammed together to act as several different translators, thus simplifying the design of the computer system.

Figure 7:
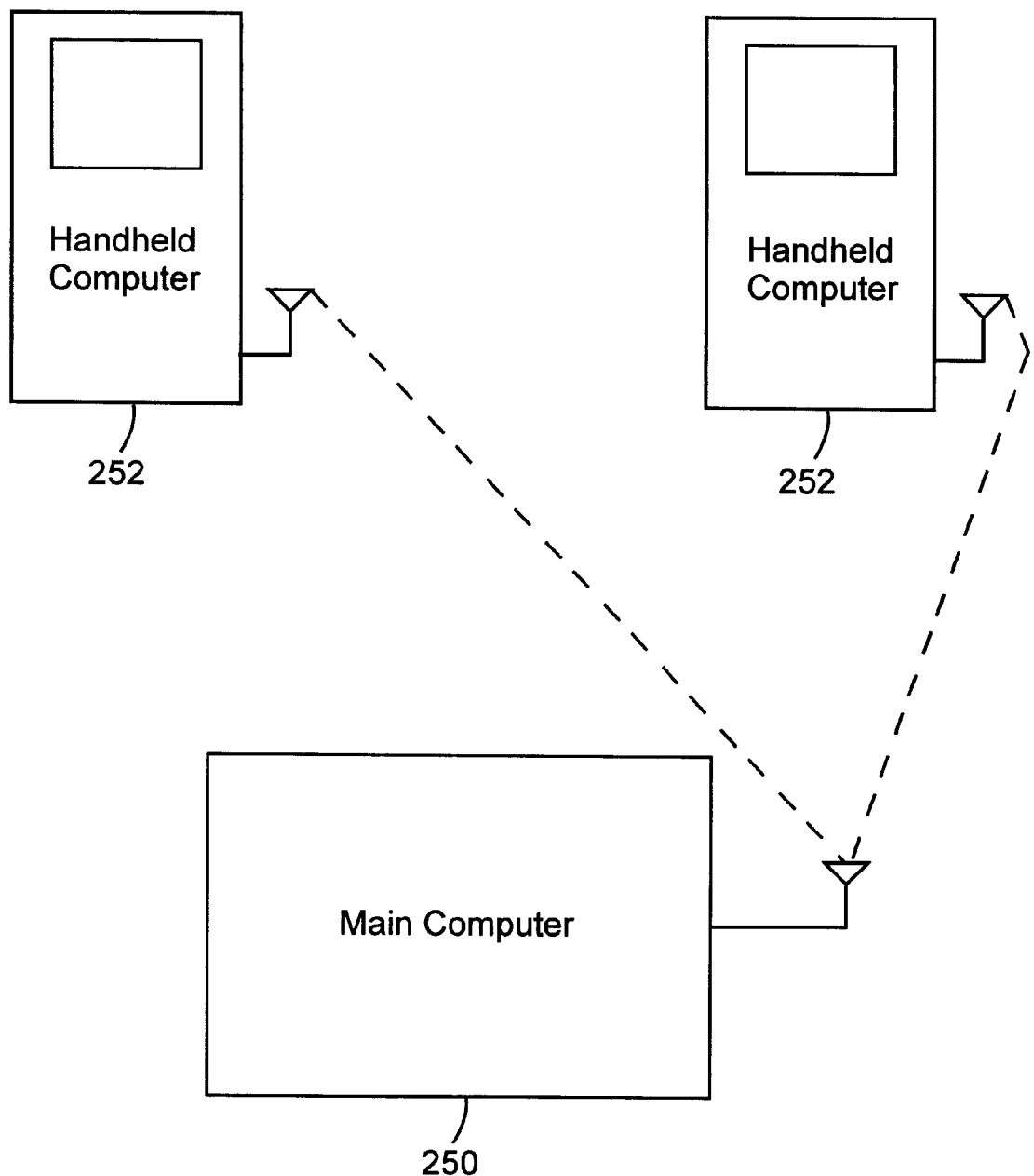
FIG. 7 is a block diagram illustrating the use of a wireless network in a system in accordance with a fourth embodiment of the present invention.

FIG. 7 is a block diagram illustrating a fourth embodiment of the present invention. In this embodiment, several of the computers may be linked using a wireless network. This network may comprise using RF signals to communicate between computers. For example, a main computer 250 may be located at a fixed location. On a day when inventory needs to be taken, a supervisor may use the main computer 250 to configure all of the handheld computers 252 on the network to contain only one those applications and data conversion programs required for inventory. If field reprogrammable gate arrays are used, it can also be used to configure the field reprogrammable gate arrays in the handheld computers 252 to the appropriate applications. Using normal means, it would take a great deal of time to reconfigure each of the handheld computers. Through this wireless network, it is possible to update or alter the operating systems of the computer instantaneously, reconfiguring the computer. This is especially important in light of the fact that the handheld computers 252 are likely to have slow processors and low amount of memory, necessitating frequent alterations in the applications and operating systems if multiple applications are to be performed. In this way, small and cheap computers may be used to run a wide variety of functions, providing almost as much flexibility as their larger and more expensive counterparts.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A configurable hand-held I/O device system comprising:
a configuration management system including a configuration module for hand-held I/O devices, a plurality of software modules having at least one application module and at least one operating system module accessible by said configuration module, and at least one external communications link configured to allow operable two-way communication between at least one external hand-held I/O device and said configuration module; and
at least one hand-held I/O device having a plurality of enablable functions, a limited capacity system having a processor and a memory, said limited capacity system being operatively coupled to said enablable functions, and an external communications link operatively configured to allow two-way communication with said configuration module, wherein said configuration module employs initial input to identify and download to said at least one hand-held I/O device an enabled set of said software modules, enabling at least one of said plurality of enablable functions, wherein one of said software modules receives data from a user and forwards it to an application module, and wherein said application module converts said data into a different format and passes said data back to said one of said software modules.

2. The configurable hand-held I/O device system of claim 1 wherein said plurality of software modules and said enabled set of software modules further include a sequencer module which sequences data from said enabled functions such that if multiple application modules request data from any one of said enabled functions, the order in which the data is requested is preserved when the data is received.

3. The configurable hand-held I/O device system of claim 1 wherein said plurality of software modules and said enabled set of software modules further include a filter module which filters incoming data from said enabled functions eliminating data which does not meet an application module's requirements.

4. The configurable hand-held I/O device system of claim 1 wherein said plurality of software modules and said enabled set of software modules further include a synchronization module which synchronizes data from more than one enabled function such that only one type of data is sent at one time to a single application module.

5. The configurable hand-held I/O device system of claim 1 wherein said configuration module further includes a comparator module which compares formats of said initial input coming from said at least one hand-held I/O device and compares it with a predetermined list of input formats to determine enablable function types.

6. The configurable hand-held I/O device system of claim 1 wherein said configuration module further includes a tag detector module, said tag detector module configured to detect and use tag fields in said initial input coming from said at least one hand-held I/O device to determine the input and hand-held I/O device types.

7. The configurable hand-held I/O device system of claim 1 wherein said at least one operating system module further includes a type analyzer which determines which application module to send input coming from said at least one enabled function.

8. The configurable hand-held I/O device system of claim 7 wherein said application receiving said input is a data translator application and where output from said data translator application is sent to a second application module.

9. The configurable hand-held I/O device system of claim 1 wherein said at least one hand-held I/O device further includes at least one field programmable gate array operably coupled to said limited capacity system.

10. The configurable hand-held I/O device system of claim 9 wherein said at least one operating system module further includes a program module to program and configure said at least one field programmable gate array to act as a data translator module.

11. The configurable hand-held I/O device system of claim 1 wherein said initial input is operably derived from a user interface operably connected to said configuration module.

12. The configurable hand-held I/O device system of claim 1 wherein said initial input is operably derived from application input to said configuration module.

13. The configurable hand-held I/O device system of claim 1, wherein said one of said software modules receives said converted data from said application module and forwards it to another application module.

14. A hand-held I/O device comprising:
a plurality of enablable functions;
a limited capacity system having a processor, a memory operably coupled to said processor, said processor being operatively coupled to said plurality of enablable functions;
a communications link having an internal portion and an external portion, said internal portion operatively coupled to said limited capacity system and said external portion configured to allow operable two-way communication between said limited capacity system and an external system; and
at least one software module operably and replaceably residing in said memory such that at least one of said plurality of enablable functions is enabled, said at least one software module having one or more application modules, wherein one of said software modules receives data from a user and forwards it to an application module, and wherein said application module converts said data into a different format and passes said data back to said one of said software modules.

15. The hand-held I/O device of claim 14 wherein said at least one software module further includes a sequencer module which sequences data from said at least one enabled functions such that if multiple application modules request data from any one of said enabled functions, the order in which the data is requested is preserved when the data is received.

16. The hand-held I/O device of claim 14 wherein said at least one software module further includes a filter module which filters the contents of data coming from said at least one enabled function, eliminating data which does not meet an application module's requirements.

17. The hand-held I/O device of claim 14 wherein said at least one software module further includes a synchronization module which synchronizes data from more than one enabled function such that only one type of data is sent at one time to a single application module.

18. The hand-held I/O device of claim 14 wherein said at least one software module further includes a tag detector module which determines which application module to send input coming from said at least one enabled function based on tag fields in said input.

19. The hand-held I/O device of claim 14 wherein said at least one software module further includes a type analyzer module which determines which application module to send input coming from said at least one enabled function depending on its type.

20. The hand-held I/O device of claim 19 wherein said application module receiving said input is a data translator application and wherein output from said data translator application is sent to a second application module.

21. The hand-held I/O device of claim 14 further comprising at least one field programmable gate array operably coupled to said limited capacity system.

22. The hand-held I/O device of claim 21 wherein said at least one software module further includes a program module to program and configure said at least one field programmable gate array to act as a data translator module.

23. The hand-held I/O device of claim 14, wherein said one of said software modules receives said converted data from said application module and forwards it to another application module.

24. A configuration management system for hand-held I/O devices comprising:

a configuration module;
a plurality of software modules including at least one application and at least one operating system module accessible by said configuration module; and
a communications link having an internal portion and an external portion, said internal portion operatively coupled to said configuration module and said external portion configured to allow operable two-way communications between said configuration module and at least one hand-held I/O device, wherein said configuration module employs input to identify, enable, and download a set of software modules from said plurality of software modules, said set of software modules configured to enable functionality in a hand-held I/O device identified by said input and having one or more application modules, wherein one of said software modules receives data from a user and forwards it to an application module, and wherein said application module converts said data into a different format and passes said data back to said one of said software modules.

25. The configuration management system for hand-held I/O devices of claim 24 wherein said plurality of software modules further includes a sequencer module which is configured to sequence data such that if multiple application modules request data from any one of a set of enabled functions in a hand-held I/O device, the order in which the data is requested is preserved when the data is received.

26. The configuration management system for hand-held I/O devices of claim 24 wherein said plurality of software modules further includes a filter module which is configured to filter data coming from an enabled function in a hand-held I/O device and eliminate data which does not meet an application module's requirements.

27. The configuration management system for hand-held I/O devices of claim 24 wherein said plurality of software modules further includes a synchronization module configured to synchronize data coming from more than one enabled function in a hand-held I/O device such that only one type of data is sent at one time to a single application module.

28. The configuration management system for hand-held I/O devices of claim 24 wherein said plurality of software modules further includes a tag detector module configured to determine which application module to send input coming from an enabled function in a hand-held device based on tag fields in said input.

29. The configuration management system for hand-held I/O devices of claim 24 wherein said plurality of software modules further includes a type analyzer module configured to determine which application module to send input coming from an enabled function in a hand-held I/O device depending on its type.

30. The configuration management system for hand-held I/O devices of claim 24 wherein said plurality of software modules further includes a data translator application module.

31. The configuration management system for hand-held I/O devices of claim 24 wherein said plurality of software modules further includes a program module configured to program and configure a field programmable gate array.

32. The configuration management system for hand-held I/O devices of claim 24, wherein said one of said software modules receives said converted data from said application module and forwards it to another application module.

33. A method of configuring and using a configurable hand-held I/O device comprising:

uploading input from a hand-held I/O device;

determining the type of said input from said hand-held I/O device;

having accessible a plurality of software modules including at least one application software module and at least one operating system software module;

choosing a set of software modules from said plurality of software modules such that said set of software modules will enable said hand-held I/O device to process said input type, wherein said set of software modules has one or more application modules;

downloading said set of software modules to said hand-held I/O device;

configuring said hand-held I/O device with said downloaded software modules;

receiving further input using said configured hand-held I/O device; and processing said further input using said configured hand-held I/O device by forwarding said input to an application module, wherein said application module converts said input into a different format and passes said data back to said one of said software modules.

34. The method of claim 33 further comprising filtering said further input to eliminate data not meeting an application's requirements.

35. The method of claim 33 further comprising synchronizing said further input such that one type of data is sent to one application module at a time.

36. The method of claim 33 further comprising comparing said uploaded input to a predetermined list of input types to determine an input type.

37. The method of claim 33 further comprising using a tag in said uploaded input to determine an input type.

38. The method of claim 33 further comprising carrying out data format conversion in said processing.

39. The method of claim 38 wherein carrying out said data format conversion uses a field programmable gate array.

40. The method of claim 39 further comprising configuring a field programmable gate array to perform a desired data format conversion.

41. The method of claim 33, further including:

receiving said converted data from said application module; and forwarding said converted data to another application module.

42. A method of configuring a configurable hand-held I/O device comprising:

receiving a configuration request for at least one hand-held I/O device;

having accessible a plurality of software modules including at least one application software module and at least one operating system software module;

choosing a set of software modules from said plurality of software modules such that said set of software modules will enable said at least one hand-held I/O device to process I/O data consistently with said configuration request, said set of software modules having one or more application modules;

downloading said set of software modules to said at least one hand-held I/O device; and configuring said hand-held I/O device with said downloaded software modules; and forwarding said I/O data to an application module, wherein said application module converts said data into a different format and passes said data back to said one of said software modules.

43. The method of claim 42 further comprising receiving a request from a user of a central system to configure at least one hand-held I/O device.

44. The method of claim 42 further comprising receiving a request from an application module to configure at least one hand-held I/O device.

45. The method of claim 42 further comprising configuring said hand-held I/O device with a filtering module to eliminate data not meeting an application's requirements.

46. The method of claim 42 further comprising configuring said hand-held I/O device with a synchronizing module such that one type of data is sent to one application module at a time.

47. The method of claim 42 further comprising configuring said hand-held I/O device with a data format conversion module.

48. The method of claim 47 wherein the data format conversion module uses a field programmable gate array.

49. The method of claim 48 further comprising configuring a field programmable gate array to perform a desired data format conversion.

50. The method of claim 42, further including:

receiving said converted data from said application module; and forwarding said converted data to another application module.

51. A configurable portable I/O device system comprising:

a configuration management system including a configuration module for portable I/O devices, a plurality of software modules having at least one application module and at least one operating system module accessible by said configuration module, and at least one external communications link configured to allow operable two-way communication between at least one external portable I/O device and said configuration module; and at least one portable I/O device having a plurality of enablable functions, a limited capacity system having a processor and a memory, said limited capacity system being operatively coupled to said enablable functions, and an external communications link operatively configured to allow two-way communication with said configuration module, wherein said configuration module employs initial input to identify and download to said at least one portable I/O device an enabled set of said software modules, said enabled set of software modules having one or more application modules, enabling at least one of said plurality of enablable functions, wherein one of said software modules forwards said initial input to an application module, and wherein said application module converts said data into a different format and passes said data back to one of said software modules.

52. The configurable portable I/O device system of claim 51 wherein said at least one portable I/O device is battery powered.

53. The configurable portable I/O device system of claim 51 wherein said plurality of software modules and said enabled set of software modules further include a sequencer module which sequences data from said enabled functions such that if multiple application modules request data from any one of said enabled functions, the order in which the data is requested is preserved when the data is received.

54. The configurable portable I/O device system of claim 51 wherein said plurality of software modules and said enabled set of software modules further include a filter module which filters incoming data from said enabled functions eliminating data which does not meet an application module's requirements.

55. The configurable portable I/O device system of claim 51 wherein said plurality of software modules and said enabled set of software modules further include a synchronization module which synchronizes data from more than one enabled function such that only one type of data is sent at one time to a single application module.

56. The configurable portable I/O device system of claim 51 wherein said configuration module further includes a comparator module which compares formats of said initial input coming from said at least one portable I/O device and compares it with a predetermined list of input formats to determine enablable function types.

57. The configurable portable I/O device system of claim 51 wherein said configuration module further includes a tag detector module, said tag detector module configured to detect and use tag fields in said initial input coming from said at least one portable I/O device to determine the input and portable I/O device types.

58. The configurable portable I/O device system of claim 51 wherein said at least one operating system module further includes a type analyzer which determines which application module to send input coming from said at least one enabled function.

59. The configurable portable I/O device system of claim 58 wherein said application receiving said input is a data translator application and wherein output from said data translator application is sent to a second application module.

60. The configurable portable I/O device system of claim 51 wherein said at least one portable I/O device further comprises at least one field programmable gate array operably coupled to said limited capacity system.

61. The configurable portable I/O device system of claim 60 wherein said at least one operating system module further includes a program module to program and configure said at least one field programmable gate array to act as a data translator module.

62. The configurable portable I/O device system of claim 51 wherein said initial input is operably derived from a user interface operably connected to said configuration module.

63. The configurable portable I/O device system of claim 51 wherein said initial input is operably derived from application input to said configuration module.

64. The configurable portable I/O device system of claim 51, wherein said one of said software modules receives said converted data from said application module and forwards it to another application module.

65. A portable I/O device comprising:
a plurality of enablable functions;
a limited capacity system having a processor, a memory operably coupled to said processor, said processor being operatively coupled to said plurality of enablable functions;
a communications link having an internal portion and an external portion, said internal portion operatively coupled to said limited capacity system and said external portion configured to allow operable two-way communication between said limited capacity system and an external system; and
at least one software module operably and replaceably residing in said memory such that at least one of said plurality of enablable functions is enabled, wherein said at least one software module has one or more application modules, one of said at least one software module configured to receive data from a user and forward it to an application module, and wherein said application module is configured to convert said data into a different format and pass said data back to said one of said software modules.

66. The portable I/O device of claim 65 further comprising a battery as a power source.

67. The portable I/O device of claim 65 wherein said at least one software module further includes a sequencer module which sequences data from said at least one of said enabled functions such that if multiple application modules request data from any one of said enabled functions, the order in which the data is requested is preserved when the data is received.

68. The portable I/O device of claim 65 wherein said at least one software module further includes a filter module which filters the contents of data coming from said at least one of said enabled functions, eliminating data which does not meet an application module's requirements.

69. The portable I/O device of claim 65 wherein said at least one software module further includes a synchronization module which synchronizes data from more than one enabled function such that only one type of data is sent at one time to a single application module.

70. The portable I/O device of claim 65 wherein said at least one software module further includes a tag detector module which determines which application module to send input coming from said at least one enabled function based on tag fields in said input.

71. The portable I/O device of claim 65 wherein said at least one software module further includes a type analyzer module which determines which application module to send input coming from said at least one enabled function depending on its type.

72. The portable I/O device of claim 71 wherein said application module receiving said input is a data translator application and where output from said data translator application is sent to a second application module.

73. The portable I/O device of claim 65 further comprising at least one field programmable gate array operably coupled to said limited capacity system.

74. The portable I/O device of claim 73 wherein said at least one software module further includes a program module to program and configure said at least one field programmable gate array to act as a data translator module.

75. The portable I/O device of claim 65, wherein said one of said software modules is further configured to receive said converted data from said application module and forwards it to another application module.

76. A configuration management system for portable I/O devices comprising:
a configuration module;
a plurality of software modules including at least one application and at least one operating system module accessible by said configuration module; and
a communications link having an internal portion and an external portion, said internal portion operatively coupled to said configuration module and said external portion configured to allow operable two-way communications between said configuration module and at least one portable I/O device, wherein said configuration module employs input to identify, enable, and download a set of software modules from said plurality of software modules, said set of software modules configured to enable functionality in a portable I/O device identified by said input and having one or more application modules, wherein one of said set of software modules is configured to receive data from a user and forward it to an application module, and wherein said application module converts said data into a different format and passes said data back to said one of said software modules.

77. The configuration management system for portable I/O devices of claim 76 wherein said external portion of said communications link is further configured to allow operable two-way communications between said configuration module and at least one battery powered portable I/O device.

78. The configuration management system for portable I/O devices of claim 76 wherein said set of software modules configured to enable functionality in a portable I/O device further enables functionality in a battery powered portable I/O device.

79. The configuration management system for portable I/O devices of claim 76 wherein said plurality of software modules further includes a sequencer module which is configured to sequence data such that if multiple application modules request data from any one of a set of enabled functions in a portable I/O device, the order in which the data is requested is preserved when the data is received.

80. The configuration management system for portable I/O devices of claim 76 wherein said plurality of software modules further includes a filter module which is configured to filter data coming from an enabled function in a portable I/O device and eliminate data which does not meet an application module's requirements.

81. The configuration management system for portable I/O devices of claim 76 wherein said plurality of software modules further includes a synchronization module configured to synchronize data coming from more than one enabled function in a portable I/O device such that only one type of data is sent at one time to a single application module.

82. The configuration management system for portable I/O devices of claim 76 wherein said plurality of software modules further includes a tag detector module configured to determine which application module to send input coming from an enabled function in a portable I/O device based on tag fields in said input.

83. The configuration management system for portable I/O devices of claim 76 wherein said plurality of software modules further includes a type analyzer module configured to determine which application module to send input coming from an enabled function in a portable I/O device depending on its type.

84. The configuration management system for portable I/O devices of claim 76 wherein said plurality of software modules further includes a data translator application module.

85. The configuration management system for portable I/O devices of claim 76 wherein said plurality of software modules further includes a program module configured to program and configure a field programmable gate array.

86. The configuration management system of claim 76, wherein said one of said software modules is further configured to receive said converted data from said application module and forwards it to another application module.

87. A method of configuring and using a configurable portable I/O device comprising:
uploading input from the portable I/O device;
determining the type of said input from the portable I/O device;
having accessible a plurality of software modules including at least one application software module and at least one operating system software module;
choosing a set of software modules from said plurality of software modules such that said set of software modules will enable the portable I/O device to process said input type, wherein said set of software modules has one or more application modules;
downloading said set of software modules to the portable I/O device;
configuring the portable I/O device with said downloaded software modules;
receiving further input using the configured portable I/O device; and
processing said further input using the configured portable I/O device by sending said further input to an application module, wherein said application module converts said data into a different format and passes said data back to said one of said software modules.

88. The method of claim 87 further comprising filtering said further input to eliminate data not meeting an application's requirements.

89. The method of claim 87 further comprising synchronizing said further input such that one type of data is sent to one application module at a time.

90. The method of claim 87 further comprising comparing said uploaded input to a predetermined list of input types to determine an input type.

91. The method of claim 87 further comprising using a tag in said uploaded input to determine an input type.

92. The method of claim 87 wherein the portable I/O device further includes a battery powered portable I/O device.

93. The method of claim 87 further comprising carrying out data format conversion in said processing.

94. The method of claim 93 wherein said carrying out data format conversion is performed with a field programmable gate array.

95. The method of claim 94 further comprising configuring the field programmable gate array to perform a desired data format conversion.

96. The method of claim 87, further including:
receiving said converted data from said application module; and
forwarding said converted data to another application module.

97. A method of configuring a configurable portable I/O device comprising:
receiving a configuration request for at least one portable I/O device;
having accessible a plurality of software modules including at least one application software module and at least one operating system software module;
choosing a set of software modules from said plurality of software modules such that said set of software modules will enable said at least one portable I/O device to process I/O data consistently with said configuration request, said set of software modules having one or more application modules;
downloading said set of software modules to said at least one portable I/O device; and
configuring said portable I/O device with said downloaded software modules; and
sending said I/O data to an application module, wherein said application module converts said data into a different format and passes said data back to said one of said software modules.

98. The method of claim 97 further comprising receiving a request from a user of a central system to configure at least one portable I/O device.

99. The method of claim 97 further comprising receiving a request from an application module to configure at least one portable I/O device.

100. The method of claim 97 further comprising configuring said portable I/O device with a filtering module to eliminate data not meeting an application's requirements.

101. The method of claim 97 further comprising configuring said portable I/O device with a synchronizing module such that one type of data is sent to one application module at a time.

102. The method of claim 97 wherein said portable I/O device further comprises a battery powered portable I/O device.

103. The method of claim 97 further comprising configuring said portable I/O device with a data format conversion module.

104. The method of claim 103 wherein said data format conversion module uses a field programmable gate array.

105. The method of claim 104 further comprising configuring a field programmable gate array to perform a desired data format conversion.

106. The method of claim 97, further including:

receiving said converted data from said application module; and forwarding said converted data to another application module.

* * * * *